May 15, 1956 R. E. NEWELL 2,745,483
AUTOMATIC GAS SAFETY CUT-OFFS OF THE THERMOCOUPLE TYPE
Filed March 14, 1952 3 Sheets-Sheet 1

INVENTOR.
ROBERT E. NEWELL.
BY *Ashworth Martin*
his ATTORNEY.

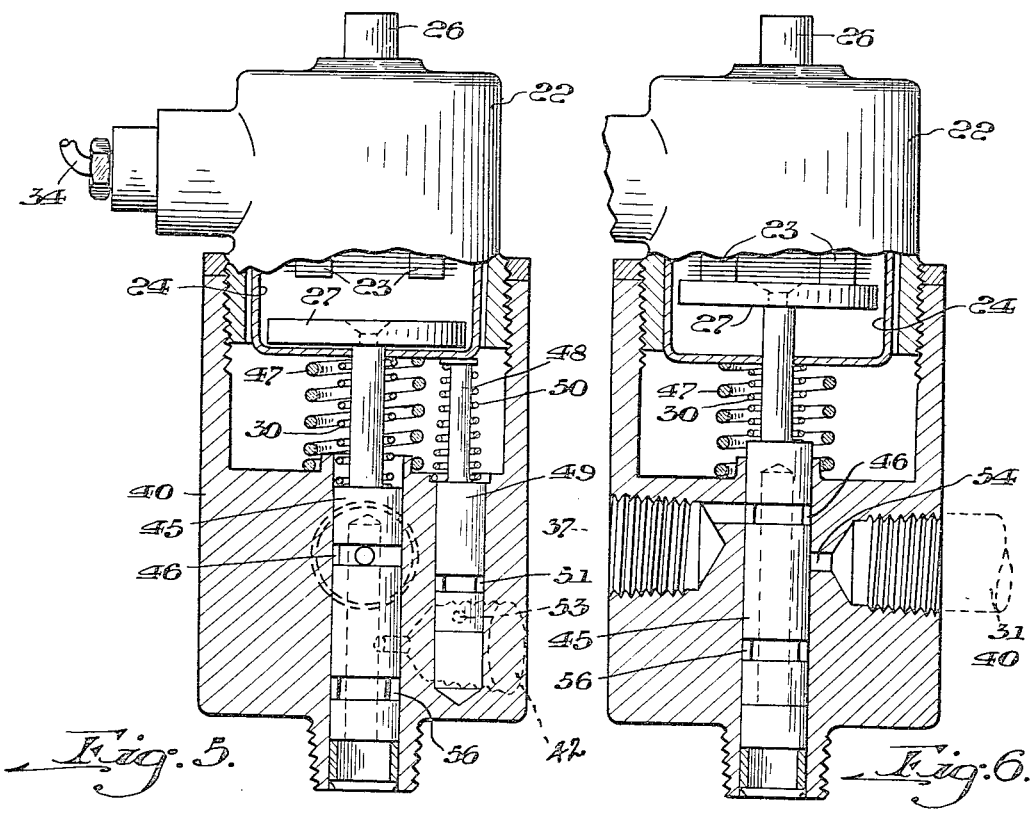
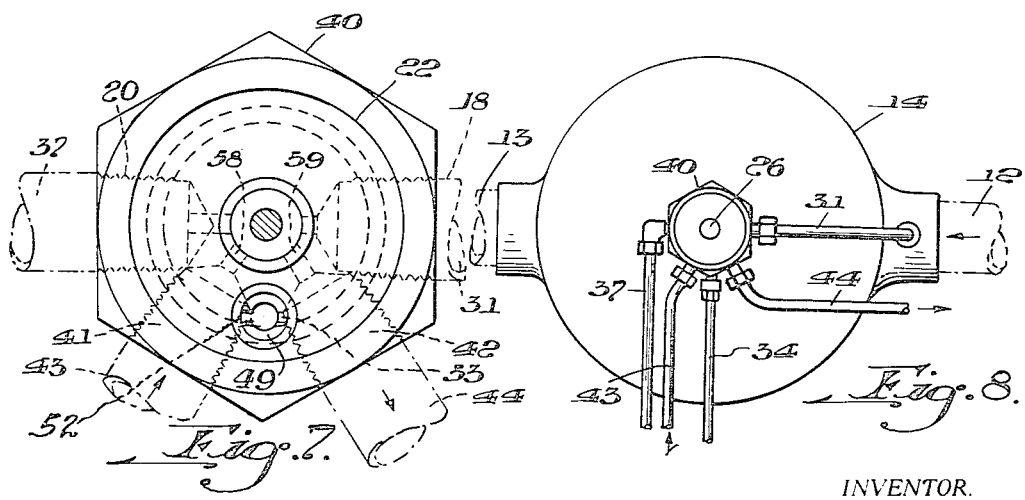
INVENTOR.
ROBERT E. NEWELL.
BY Archworth Martin
his ATTORNEY.

May 15, 1956 R. E. NEWELL 2,745,483
AUTOMATIC GAS SAFETY CUT-OFFS OF THE THERMOCOUPLE TYPE
Filed March 14, 1952 3 Sheets-Sheet 3

INVENTOR.
ROBERT E. NEWELL.
BY Archworth Martin
his ATTORNEY

United States Patent Office 2,745,483
Patented May 15, 1956

2,745,483
AUTOMATIC GAS SAFETY CUT-OFFS OF THE THERMOCOUPLE TYPE

Robert E. Newell, Irwin, Pa.

Application March 14, 1952, Serial No. 276,623

2 Claims. (Cl. 158—129)

This invention relates to automatic gas safety cut-offs, or "flame failure" devices, of the thermocouple type, the general design herein described being intended for use on a bleed or "weep" line, connected with a main diaphragm valve, although the principal features are adaptable for other safety control uses as well.

My invention has for its objects; first, to provide a two-way valve arrangement for control by a thermocouple magnet; secondly, to provide means for 100% cut-off, including the pilot as well as the main burner; and thirdly, to achieve both of these objects without losing the advantage of "safe lighting," which is now a well-known advantage of pilot-activated thermocouple controls. That is, in lighting the heater, it is impossible to turn the gas on to the main burner without first actually lighting the pilot.

Of the various methods of controlling a diaphragm valve by balancing and relieving the pressure above the diaphragm, the method preferred is the "puff bleed," or "momentary bleed" method, in which the bleed gas escapes for only a few seconds while the diaphragm is opening or closing, instead of burning a small amount continuously. To do this, a quick-acting 2-way valve is necessary. These have been provided in thermostats, both electrical and mechanical, but none that I know of have heretofore been in connection with safety pilots of the thermocouple type, in which the valve is manually reset, which is the type of thermocouple pilot most generally used.

Some of the forms which my invention may take are shown in the accompanying drawings, wherein:

Figs. 5 and 6 are views similar to Figs. 1 and 2, but showing also an auxiliary valve for controlling flow of gas to a pilot burner;

Fig. 7 is a plan view, partly in section, of the structure of Fig. 5; Fig. 8 is a plan view on a reduced scale, showing the various pipe connections used with the control valve and the diaphragm valve;

Figure 1:
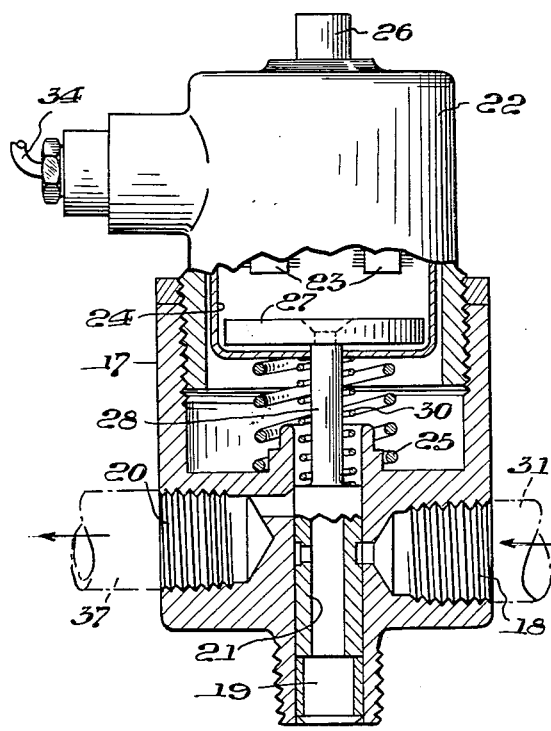
Figure 1 is a vertical view, partly in section, showing the two-way control valve of Fig. 3 on a greatly enlarged scale, with the two-way valve in position to maintain the diaphragm valve of Fig. 3 in its closed position.

Referring first to Figs. 1 to 4, I show a gas burner 11 that is supplied from a main gas line having pipes 12 and 13, connected through a diaphragm valve casing 14, the diaphragm being indicated by the numeral 15. The safety device for cutting off flow of the gas to the main burner, upon extinguishment of the flame at a pilot burner 16, is carried by a control valve casing 17 which has ports 18, 19 and 20, the ports 18 and 19 being controlled by a valve 21, which when the pilot is extinguished, will be in position to provide communication between the gas line 12 and the upper face of the diaphragm 15.

A housing 22 for an electro-magnet 23 is carried by the casing 17 which has screw-threaded connection with the casing 14 of the diaphragm valve. The electro-magnet is contained within a box or casing 24 that is yieldably held in its uppermost position by a spring 25, as shown in Fig. 1 and which has an extension 26 that serves as a push-button for depressing it against the spring 25 and bringing the magnet 23 into engagement with an armature 27 that is connected to a valve stem 28 which carries the valve 21.

A light spring 30 is interposed between the box 24 and the body of the valve 21 and urges the valve to its lowermost position as shown in Fig. 1. When the magnet 23 is de-energized, the valve 21 will be in its lower position as in Fig. 1, so that gas will flow from the gas line 12 into a by-pass line 31 and thence through the port 18 to the upper side of the diaphragm to shut off flow of gas to the main burner.

A thermocouple 32 of a conventional form is positioned at the pilot burner 16, so that it will be activated when the flame is burning, to energize the magnet 23. A tube 34 leads from the thermocouple 32 (Fig. 4) to the housing 22, the tube containing conductors 35 for the thermocouple current. These conductors are coiled somewhat in the housing 22 to permit downward movement of the box 24.

In setting the device into operation for the purpose of lighting the main burner, the button 26 will be depressed to move the electro-magnet 33 from the position of Fig. 1 to a lower position, against the armature 27. Lighting of the pilot 16 and consequent activation of the thermocouple will result in energization of the magnet 23, so that upon release of the push-button, the magnet will be moved up under the influence of its spring 25, thus raising the armature 27, through the attraction of the magnet and carrying the valve 21 to the position shown in Fig. 2. At this position, flow through the inlet port 18 is cut off and flow through the port 20 to an exhaust pipe 37 that leads to the vicinity of the burner is established, to exhaust gas from above the diaphragm 15. The pressure in the line 12 will then lift the diaphragm from its seat, and gas will flow through 13 to the main burner.

Figure 2:
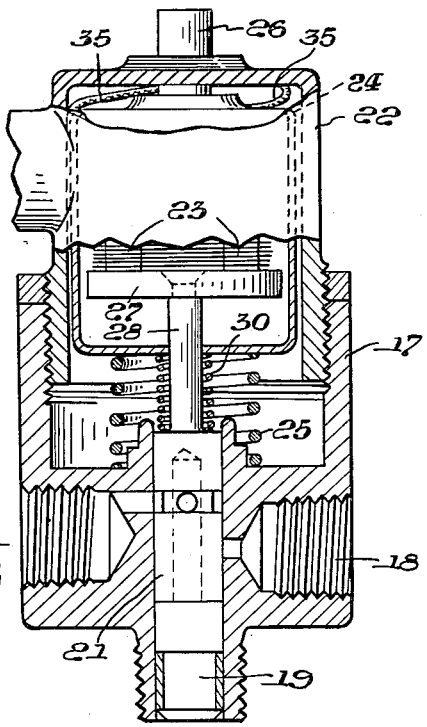
Fig. 2 is a view of the valve of Fig. 1 in the position where it shuts off pressure to the upper side of the diaphragm and allows exhaust of gas from the upper side of the diaphragm.
Figure 3:
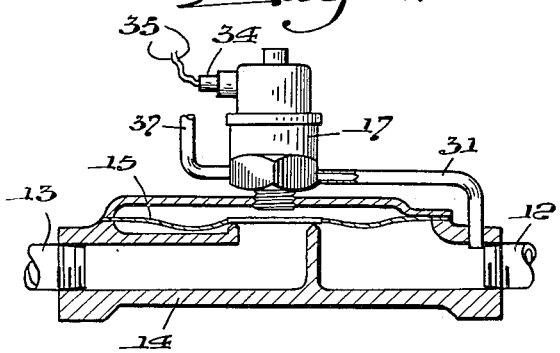
Fig. 3 is a sectional view of the diaphragm valve that controls flow of gas to a main burner, in its closed position.

Upon extinguishment of the pilot flame, the magnet will be de-energized, thus permitting the spring 30 to return the valve from the position shown in Fig. 2 to that shown in Fig. 1, at which position gas pressure will again be admitted to the upper side of the diaphragm 15 and the supply of gas to the main burner cut off.

In Figs. 5 to 8b, I show a modification of the control device of Figs. 1 to 4. In this other apparatus, provision is made for controlling the supply of gas to the pilot flame, through operation of the valve mechanism that controls flow to and exhaust from the upper side of the diaphragm valve 15. As shown in Figs. 5 to 8, the control valve is operated by a thermocouple whose conductor wires extend through the pipe 34 into the upper end of the magnet housing 22 as in Figs. 1 to 4. Also, the magnet 23 with its box 24, push-button 26 and armature 27 are like the correspondingly numbered elements in Figs. 1 to 4.

Figure 4:
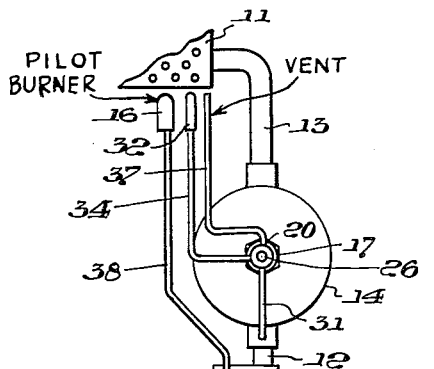
Fig. 4 is a schematic view, mainly in plan, showing the manner in which the control valve of Fig. 1 and its associated pilot valve and thermocouple device are mounted in co-operative relation with respect to one another.
Figure 8A:
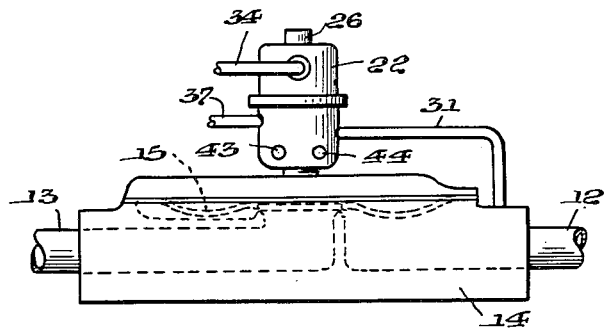
Fig. 8a is an elevational view of the structure of Fig. 8.
Figure 8B:
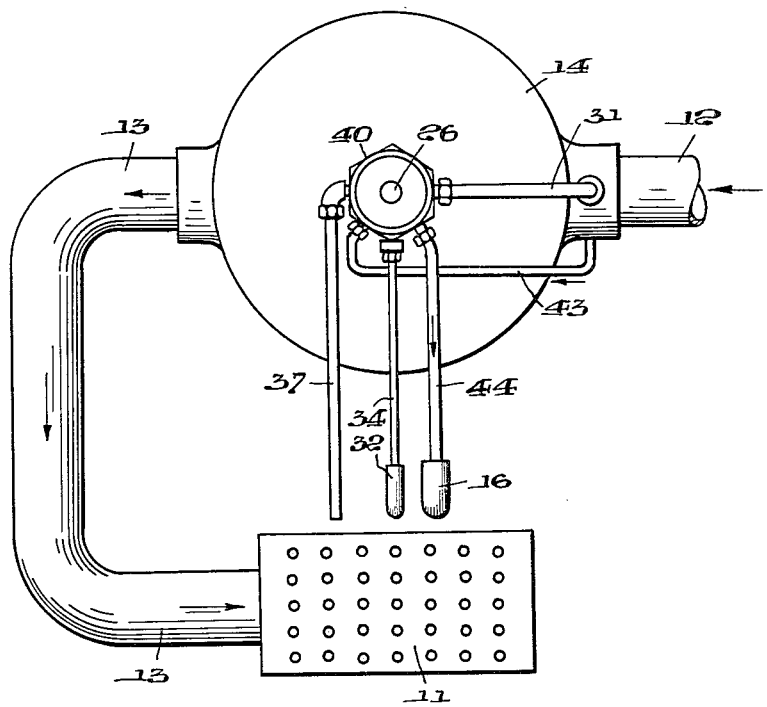
Fig. 8b is a plan view showing Fig. 8 complete with a burner and parts associated with the burner.

However, the valve body 40 has in addition to the ports 18 and 20, a pair of inlet and outlet openings, 41 and 42, through which gas is supplied to the pilot burner 16 as in Fig. 4. An inlet pipe 43 leads from the main gas line 12 to the inlet at 41 and a pipe 44 leads from the port 42 to the pilot burner 16, whereas in Fig. 4, the pipe 38 carries gas to the pilot flame directly from the main gas line 12.

As in the case of Figs. 1 to 4, when the flame is extinguished and the magnet 23 thereby de-energized, the small spring 30 will move the main control valve 45 downwardly to establish communication through the by-pass pipe 31 with the upper surface of the diaphragm 15, the annular groove or port 46 in the valve and its central bore being provided for flow to the upper side of the diaphragm as is the case with the valve 21 of Fig. 1, thereby causing shutting off of the flow of gas to the main burner.

When the magnet casing 24 is held in its uppermost position by the large spring 47, the stem 48 of a control valve 49 for the pilot gas is held in its uppermost position by a spring 50 as shown in Fig. 5. If now it is desired to light the pilot 16 and set the gas burner 11 in operation, the pushbutton 26 will be depressed to bring the magnet 23 into engagement with the armature 27, thereby compressing the spring 47 as explained in the description of Figs. 1 to 3. The downward movement of the casing 24 depresses the valve 49 against its spring 50 and brings an annular port or passage 51 of the valve into registry with a pair of ports 52 and 53 that communicate with the inlet and outlet openings 41 and 42 respectively, the casing thereby serving as an operating connection. Pilot gas is thereby permitted to flow from the gas line 12 through the pipe 44 and to the pilot burner 16. The push-button 26 will be held down long enough for the pilot flame to activate the thermocouple 32, to thereby energize the magnet 23. Thereupon, the push-button 26 will be released, allowing the spring 47 to expand upwardly, carrying with it the armature 27 which will be attracted by the electro-magnet, so that the upper annular port 46 will be moved out of registry with the by-pass inlet port 54 that corresponds to the inlet 18 of Fig. 2, and thus cutting off gas pressure against the upper face of the diaphragm 15.

In this respect, the operation is the same as in Figs. 1 to 4, however, the release of the valve stem 48 causing the valve 49 to be moved upwardly by the spring 50, thus cutting off flow of pilot gas past the valve 49. The valve 45 has an annular port 56 adjacent to its lower end, which, when it is brought to its raised position as shown in Fig. 6, establishes communication between ports 58 and 59 leading from and to the inlet openings 41 and 42 respectively, but not with the central bore in valve 45, to thereby cause a supply of pilot gas to the burner during the functioning of the burner and the retention of the armature 27 in its uppermost position, as shown in Fig. 6.

I claim as my invention:

1. The combination with a gas line and a fluid pressure-operated valve, operable to shut off flow of gas through the line, of a control device therefor, comprising a valve casing having a port communicating with the gas line at a point in advance of the said valve and having a port leading to one side of the pressure-operated valve, for utilizing the line pressure to hold the valve closed, a valve in said casing movable to a position to establish communication between said ports, a spring for yieldably holding the valve in said position, an armature carried by the valve, an electro-magnetic device energized by the heat of a gas flame, for holding the control valve in closed position with respect to the first-named port and against the spring pressure, an exhaust port for the valve chamber which has communication with the second-named port when the control valve is held in its last-named position by the electro-magnet, the said spring serving to return the control valve to its first-named position upon failure of the gas flame, a second spring, the magnet being manually movable into engagement with the armature against the resistance of this second spring, a pilot gas line for supplying a pilot flame, a valve therefor, means yieldably holding the valve in position to cut off flow through said line, and a connection between this last-named valve and the electromagnet, for moving the valve to open position for flow through said pilot line, when the magnet is moved against the pressure of the second-named spring.

2. The combination with a gas line and a fluid pressure-operated valve, operable to shut off flow of gas through the line, of a control device therefor, comprising a valve casing having a port communicating with the gas line at a point in advance of the said valve and having a port leading to one side of the pressure-operated valve, for utilizing the line pressure to hold the valve closed, a valve in said casing movable to a position to establish communication between said ports, a spring for yieldably holding the valve in said position, an armature carried by the valve, an electro-magnetic device energized by the heat of a gas flame, for holding the control valve in closed position with respect to the first-named port and against the spring pressure, the electro-magnet being manually movable from its normal position, to engage the armature for return of the control valve into position to close the said port that communicates with the gas line against the said spring pressure upon energization of the magnet, a pilot gas line for supplying a pilot flame, a valve therefor, means that serve to hold the valve open while the magnet is engaged with the armature and before the magnet is restored to its normal position, and means for automatically closing the pilot gas valve when the magnet is de-energized.

References Cited in the file of this patent

UNITED STATES PATENTS

| | | |
|---|---|---|
| 1,905,414 | Leach | Apr. 25, 1933 |
| 2,183,855 | Mansky | Dec. 19, 1939 |
| 2,185,423 | Andersen | Jan. 2, 1940 |
| 2,212,352 | Plein | Aug. 20, 1940 |
| 2,265,294 | Lange | Dec. 9, 1941 |
| 2,290,108 | Mantz | July 14, 1942 |
| 2,294,693 | Ray | Sept. 1, 1942 |
| 2,311,069 | Miller | Feb. 16, 1943 |
| 2,372,564 | Engholdt | Mar. 27, 1945 |
| 2,443,892 | Caparone | June 22, 1948 |
| 2,461,615 | Taylor | Feb. 15, 1949 |
| 2,512,173 | Ray | June 20, 1950 |
| 2,542,127 | Ewing | Feb. 20, 1951 |
| 2,658,515 | Jackson | Nov. 10, 1953 |

FOREIGN PATENTS

| | | |
|---|---|---|
| 876,587 | France | Aug. 10, 1942 |